United States Patent
Chen

(10) Patent No.: US 7,213,962 B2
(45) Date of Patent: May 8, 2007

(54) HIGH-EFFICIENCY CIRCUIT-EQUIPPED LIGHT EMITTING BOARD

(76) Inventor: Owen Chen, 624 Pratt Ave., Schaumburg, IL (US) 60194

( * ) Notice: Subject to any disclaimer, the term of this patent is extended or adjusted under 35 U.S.C. 154(b) by 101 days.

(21) Appl. No.: 10/725,554

(22) Filed: Dec. 3, 2003

(65) Prior Publication Data
US 2004/0165402 A1 Aug. 26, 2004

(30) Foreign Application Priority Data
Feb. 26, 2003 (TW) .............................. 92202983 U

(51) Int. Cl.
F21V 5/00 (2006.01)

(52) U.S. Cl. ................. 362/812; 362/800; 362/84; 362/497; 362/276; 40/544

(58) Field of Classification Search ................. 362/84, 362/27, 29, 276, 800, 802, 497; 40/204, 40/544; 315/189, 186, 193
See application file for complete search history.

(56) References Cited

U.S. PATENT DOCUMENTS

| | | | | |
|---|---|---|---|---|
| 5,228,223 A * | 7/1993 | Lan | .............................. | 40/204 |
| 5,533,289 A * | 7/1996 | Hoffman | ....................... | 40/544 |
| 6,027,235 A * | 2/2000 | Chen | ........................... | 362/497 |
| 6,511,195 B2 * | 1/2003 | Marinacci | ..................... | 362/43 |
| 6,615,520 B2 * | 9/2003 | Landers et al. | ............... | 40/546 |
| 6,641,276 B1 * | 11/2003 | Macher et al. | ................. | 362/84 |
| 6,799,877 B2 * | 10/2004 | Watkins et al. | ............. | 362/542 |
| 2004/0114344 A1 * | 6/2004 | Burtsev et al. | ................ | 362/31 |

* cited by examiner

Primary Examiner—Sandra O'Shea
Assistant Examiner—Anabel Ton
(74) Attorney, Agent, or Firm—McCracken & Frank LLP

(57) ABSTRACT

The present invention relates to a high-efficiency circuit-equipped light emitting board, which is made so as to be usable as advertisement boards and signs, and can be used either indoor ones or outdoor ones. The light emitting board includes inner and outer frames, a display board, light emitting diodes, and a driving circuit for making the light emitting diodes to produce light. The display board allows light to travel through it, and has words, patterns, characters, drawings or signs adhered thereto. The display board is disposed between the frames in such a way that users can easily substitute it with a different one. And, the present board is watertight.

5 Claims, 7 Drawing Sheets

HIGH-EFFICIENCY CIRCUIT-EQUIPPED LIGHT EMITTING BOARD

BACKGROUND OF THE INVENTION

1. Field of the Invention

The present invention relates to a high-efficiency circuit-equipped light emitting board, more particularly one, which is made in such a manner as to be used as advertisement boards and signs, either indoor ones or outdoor ones, with easy-to-replace nature, and which is watertight, and has low electricity consumption, good resistance to high and low temperature, and long lifespan for using.

2. Brief Description of the Prior Art

Conventionally, road signs, doorplates, advertisement boards and so on, have to equipped with additional illumination so that information thereon can be clearly seen in the dark. However, such additional illumination itself and installation thereof cause increase to cost of the signs, and occupies space, not very convenient and economical to use.

To overcome the above disadvantages, another information providing equipment has light source integrated with a panel, which allows light to travel through, and has words, signs and so on, adhered to it, and has a box for holding the light source and the panel therein. Such information providing equipment is a big size because fluorescent tubes, starters and so on together are relatively big that have to be used on it. And, the panel is joined to the box in a secure manner, not able to be easily substituted with a different one according to the user's needs. Therefore, such information providing equipment is still not convenient to use.

In both of above ways, gas-filled fluorescent tubes and bulbs are used as the light source to occupy much space. And, use of fluorescent tubes and bulbs will add to the cost of maintenance because the average lifespan of bulbs for using is five hundred hours, and that of gas-filled fluorescent tubes is four thousand hours. Furthermore, such tubes and bulbs are not suitable for using outdoors in cold weather.

In recent years, light emitting diodes have been used in industry for making license plates of cars easily visible in light of the fact that light emitting diodes are small in size, consume less power, and have relatively long life spans for using. However, common light providing devices having LED for car license plates are equipped with large and complicated circuits or IC for activation and control thereof. Consequently, manufacturing cost is relatively high, and has many parts added to the maintenance cost of such light providing devices. Furthermore, use of light emitting diodes is still limited to car license plates.

SUMMARY OF THE INVENTION

It is a main object of the present invention to provide a circuit-equipped light emitting board for overcoming the above disadvantages as described in the Background.

The circuit-equipped light emitting board of the present invention includes a driving circuit, which consists of resistors, and a semi-conductor switch, for activating light emitting elements connected in series therewith; thus, the present invention has reduced amount of parts, and structure thereof is less complicated, and in turns, cost of manufacturing and maintenance reduces.

The circuit-equipped light emitting board of the present invention further includes an display board having signs adhered thereto, an inner frame having a holding recess, and an outer frame having an opening; the outer frame is joined to the inner frame with the opening facing the holding recess; the display board is disposed between the frames with an edge of the opening preventing it from falling out of the outer frame; thus, the display board can be easily removed from the holding recess for substituting with a different one.

A photosensitive resistor can be provided to the invention; then, when it is dark, the light emitting elements can be activated by the photosensitive resistor to emit light. On the contrary, the light emitting elements will be disconnected the output of the power source automatically and arranged the LED in pairs for working. In using, it meets the purpose of saving electricity.

LED, which can be used in a relatively large temperature range (−30 to 80 degree Centigrade), has a long lifespan for using and consumes less power. It can be used together with resistors for producing light.

Reflective surfaces, which are set on the upper and lower edges of the display board, can reflect the LED light traveling through the holes aligned on the upper edge of the display board in order not to scatter excessively. Furthermore, during the procedure of LED light's reflecting repeatedly on the upper and lower edges of the display board, the LED light will shine outwardly, as if the desired words and pictures are stayed close to the surface of the display board, in order to complete the manifestation on the theory of optical path resistance.

BRIEF DESCRIPTION OF THE DRAWINGS

The present invention will be better understood by referring to the accompanying drawings, wherein.

DETAILED DESCRIPTION OF THE PREFERRED EMBODIMENTS

Figure 1:
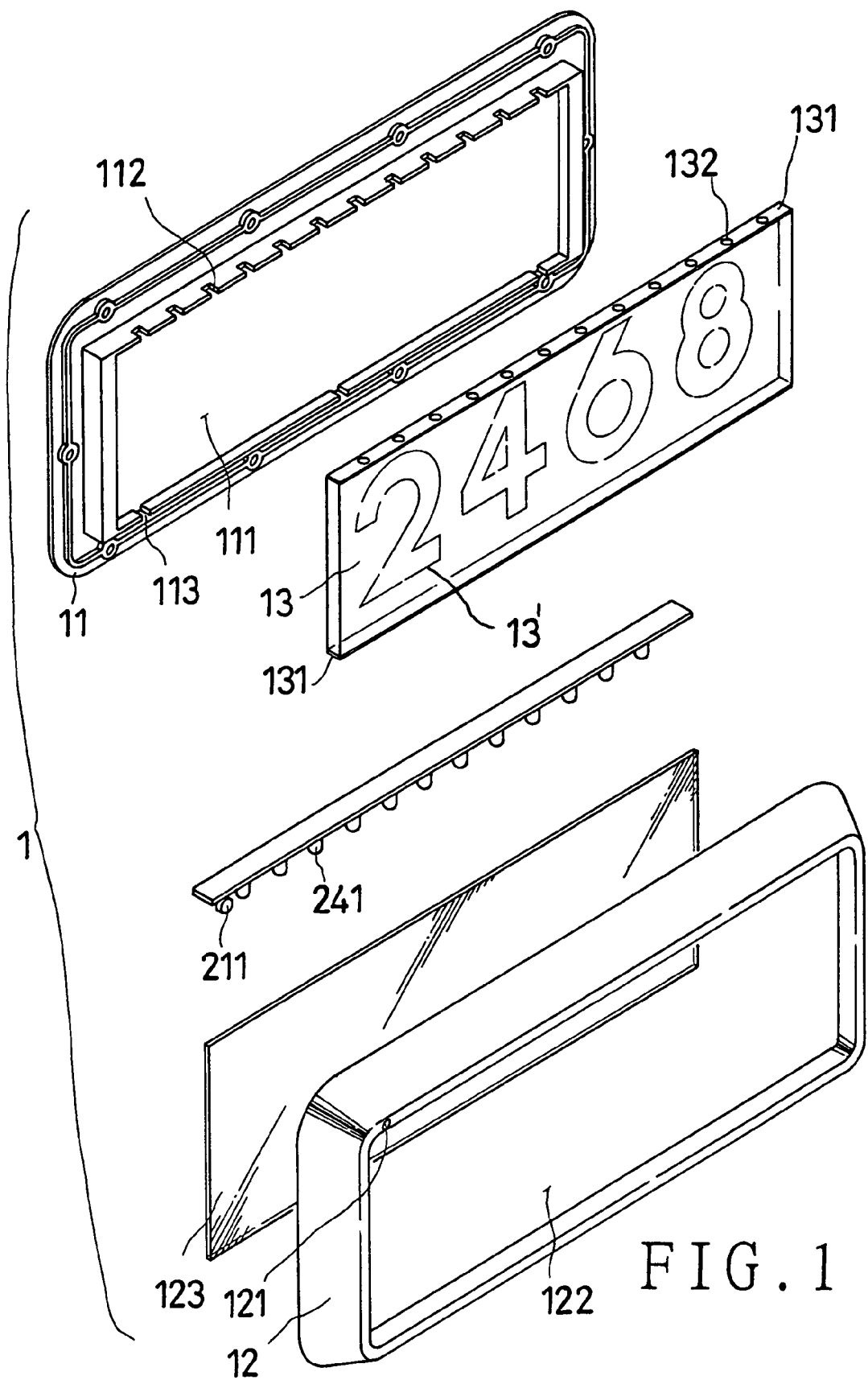
FIG. 1 is an exploded perspective view of the circuit-equipped light emitting board according to the present invention.
Figure 2:
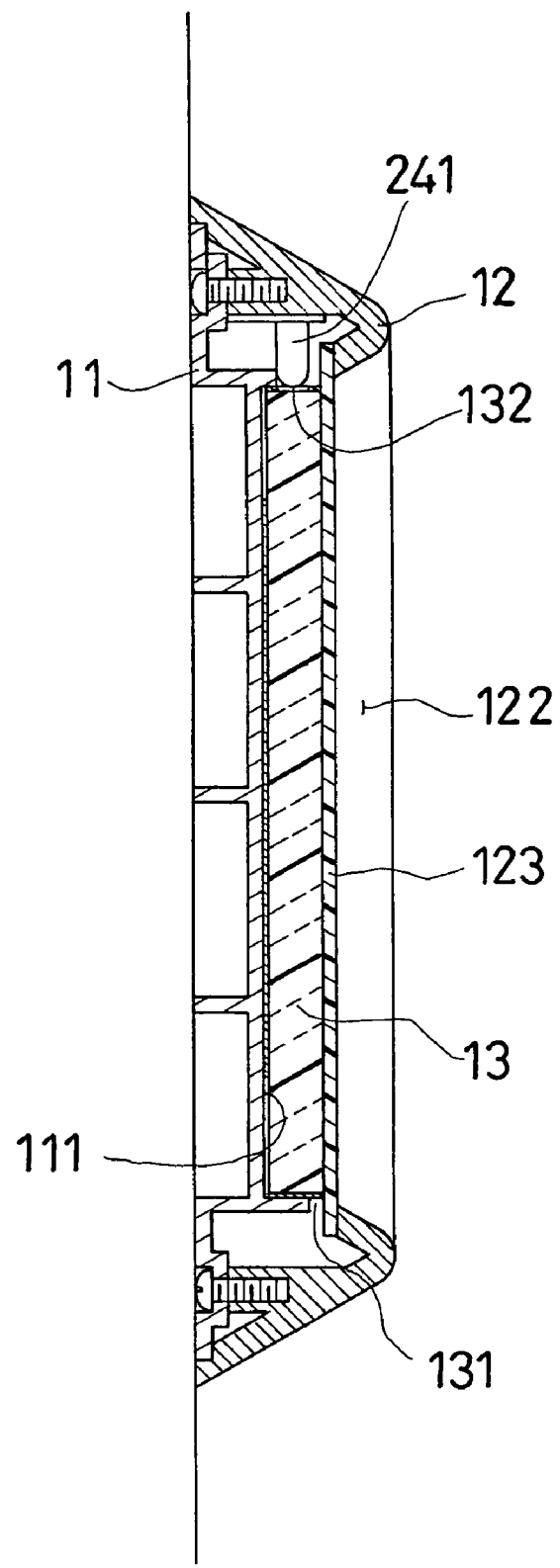
FIG. 2 is a cross-sectional view of the circuit-equipped light emitting board according to the present invention.
Figure 3:
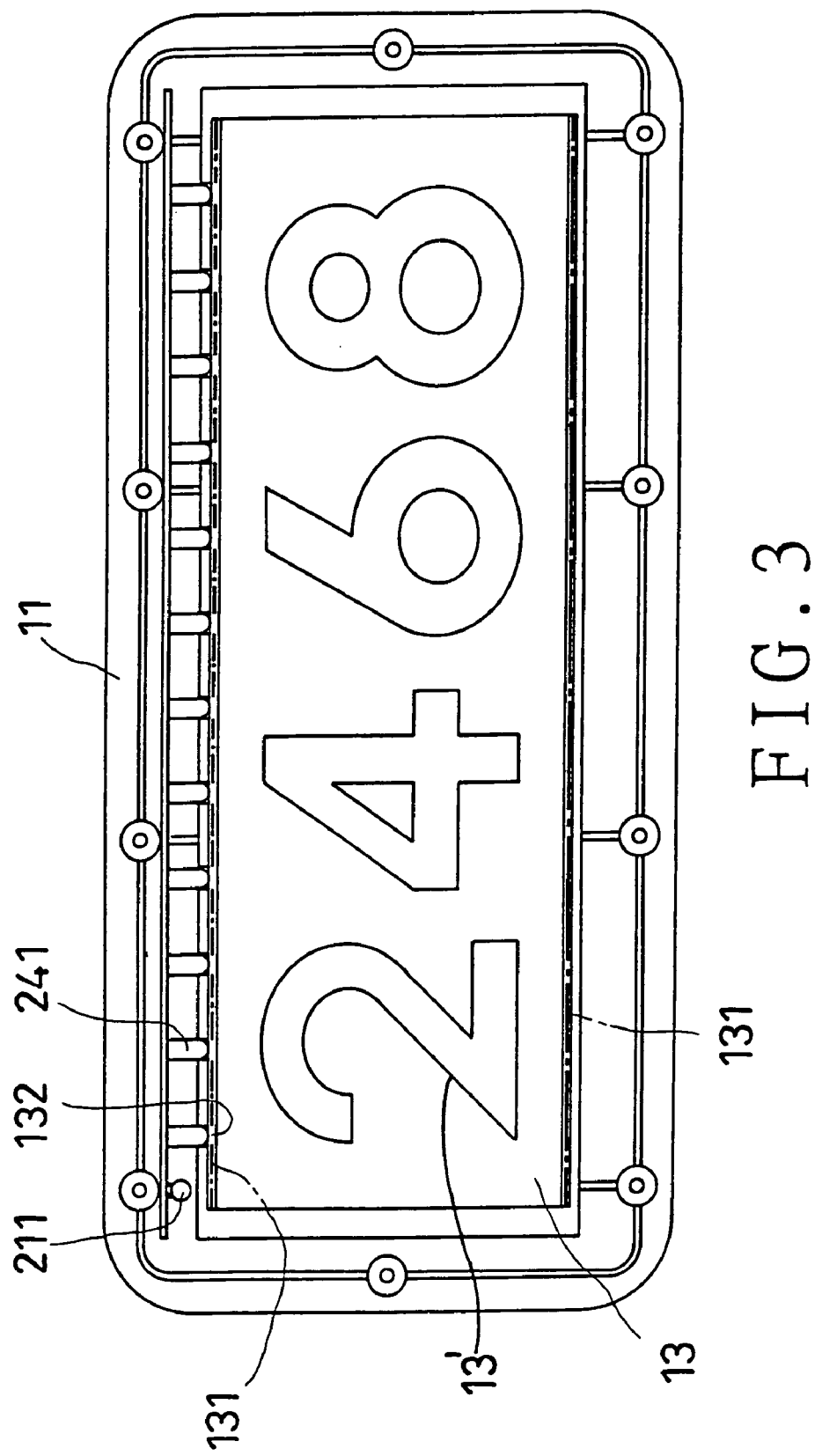
FIG. 3 is another cross-sectional view of the circuit-equipped light emitting board of the present invention.
Figure 4:
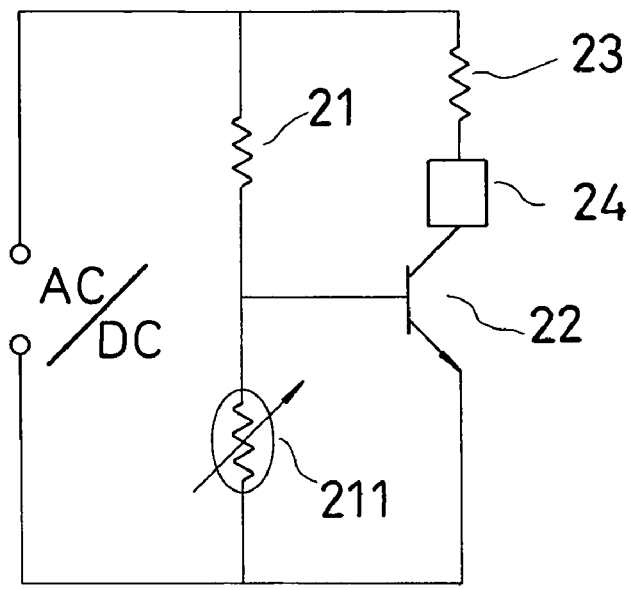
FIG. 4 is a circuit diagram of the circuit-equipped light emitting board of the present invention.

Referring to FIGS. 1 to 3, a first embodiment of a high-efficiency circuit-equipped light emitting board in the present invention includes a main body 1, and a driving circuit 2.

The main body 1 includes an inner frame 11, an outer frame 12 joined to the inner frame 11, and an display board 13, which is made of such materials as to allow light to travel through while having words, patterns, characters, drawings or signs 13' adhered thereto, and which is disposed between the inner and the outer frames 11, 12. The inner frame 11 has a surrounding portion defining a holding recess 111 for holding the indicating board 13, several gaps 112 on an upper section of the surrounding portion, and several engaging cavities 113 on a lower section of the surrounding portion. The indicating board 13 has reflective surfaces 131, 131 on both upper and lower edges thereof, and holes 132 on the upper edge, which are aligned with corresponding gaps 112 of the inner frame 11. The outer frame 12 is fitted to the inner frame with an opening 122 thereof facing the holding recess 111. The outer frame 12 further has a hole 121. A light-passable plate 123 is disposed over the front side of the indicating board 13, and both the board 13 and the plate 123 are disposed in the holding recess 111 with an edge of the opening 122 of the outer frame 12 preventing them from falling out of the outer frame 12. Thus, the indicating board 13 is stopped from falling out of the outer frame 12, and light can travel outside through the indicating board 13 and the light-passable plate 123 for making words, patterns, characters, drawings or signs on the board 13 easily visible.

Figure 5:
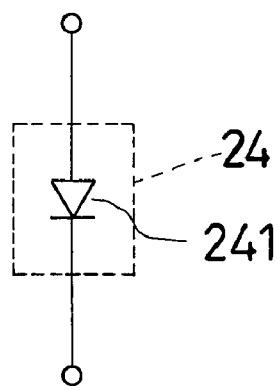
FIG. 5 is a partial circuit diagram of the circuit-equipped light emitting board of the present invention.

The driving circuit 2 is adaptable for different currents, i.e. direct current and alternating current. Two power input terminals of the driving circuit 2 are respectively connected to first end of a resistor 21, 211, wherein the resistor 211 can be a photosensitive resistor. The other ends of the resistors 21, 211 are electrically connected to a terminal of a semi-conductor switch 22, e.g. a transistor, and another terminal of the semi-conductor switch 22 is connected to one of the power input terminals of the driving circuit 2. A third terminal of the semi-conductor switch 22 is connected to both a resistor 23 and a light-emitting device 24, and then connected to the other one of the power input terminals of the driving circuit 2; the light-emitting device 24 can be comprised of LEDs 241, as shown in FIG. 5.

In assembling the present invention, the driving circuit 2 is disposed in the main body 1 with the photosensitive resistor 211 being located in such position that light outside the main body 1 can travel to the photosensitive resistor 211 via the hole 121 of the outer frame 12 to be sensed by means of the same. The LEDs of the light-emitting device 24 are fitted to respective gaps 112 of the inner frame 11. Thus, when it is dark, i.e. there is not enough light around, the photosensitive resistor 211 will activate the semi-conductor switch 22 so as to make the LEDs 241 to emit light. Light of the LEDs 241 then passes through the holes 132 of the indicating board 13, and is reflected by means of the upper and the lower reflective surfaces 131, 131, and finally passes through the front of the indicating board 13 and the light-passable plate 123, and in turns, words, patterns, characters, drawings and signs on the board 13 can be clearly seen. This structure of the main body 1 allows the display board 13 to be easily removed from the holding recess 111 for substituting with a different one. And, use of LEDs 241 in the driving circuit 2 as light source helps electricity consumption and size of the invention to be reduced. In addition, LEDs has relatively long lifespan for using as compared with conventional gas-filled fluorescent tubes and bulbs.

Figure 6:
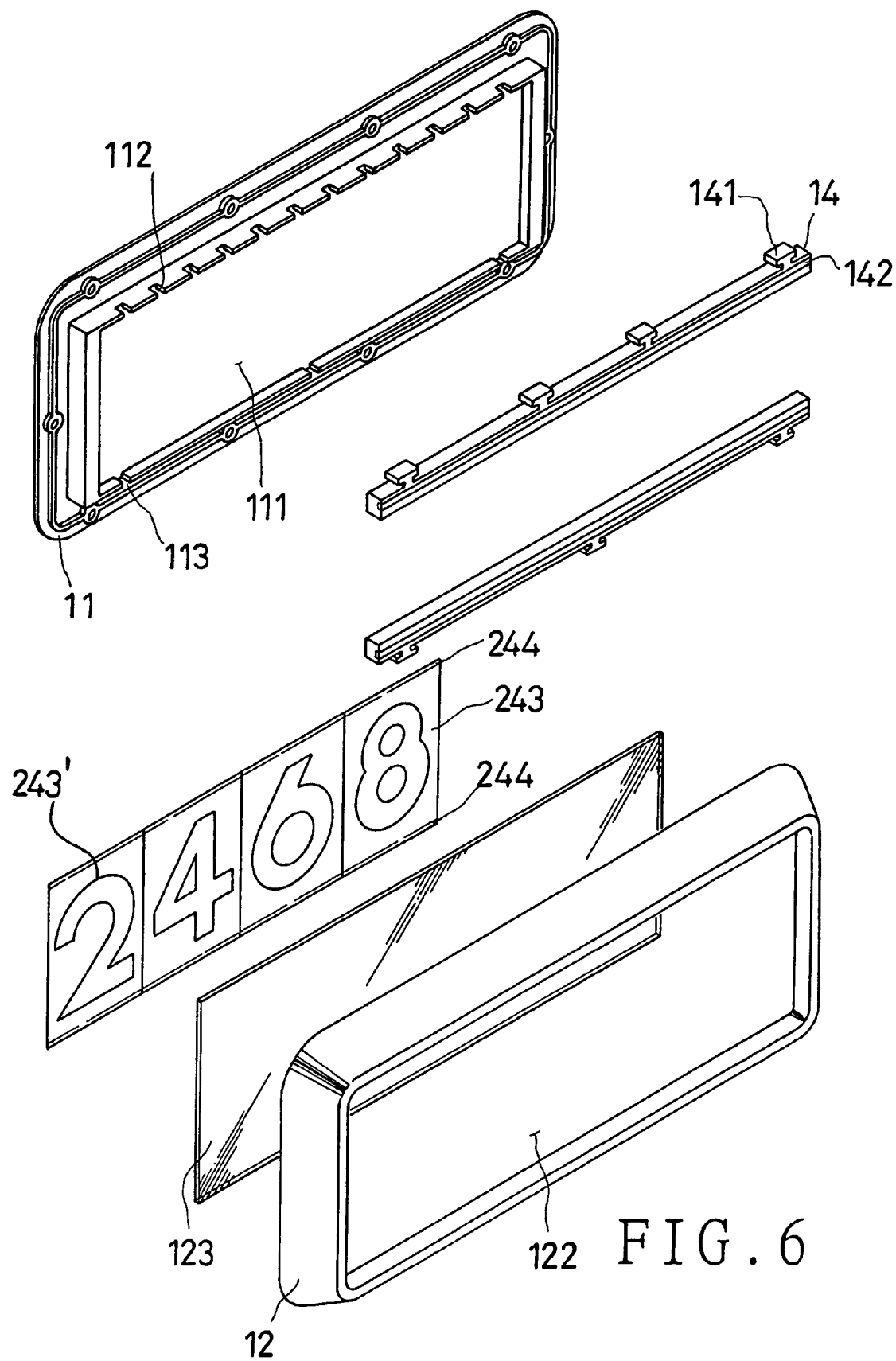
FIG. 6 is an exploded perspective view of the circuit-equipped light emitting board of the second embodiment.
Figure 7:
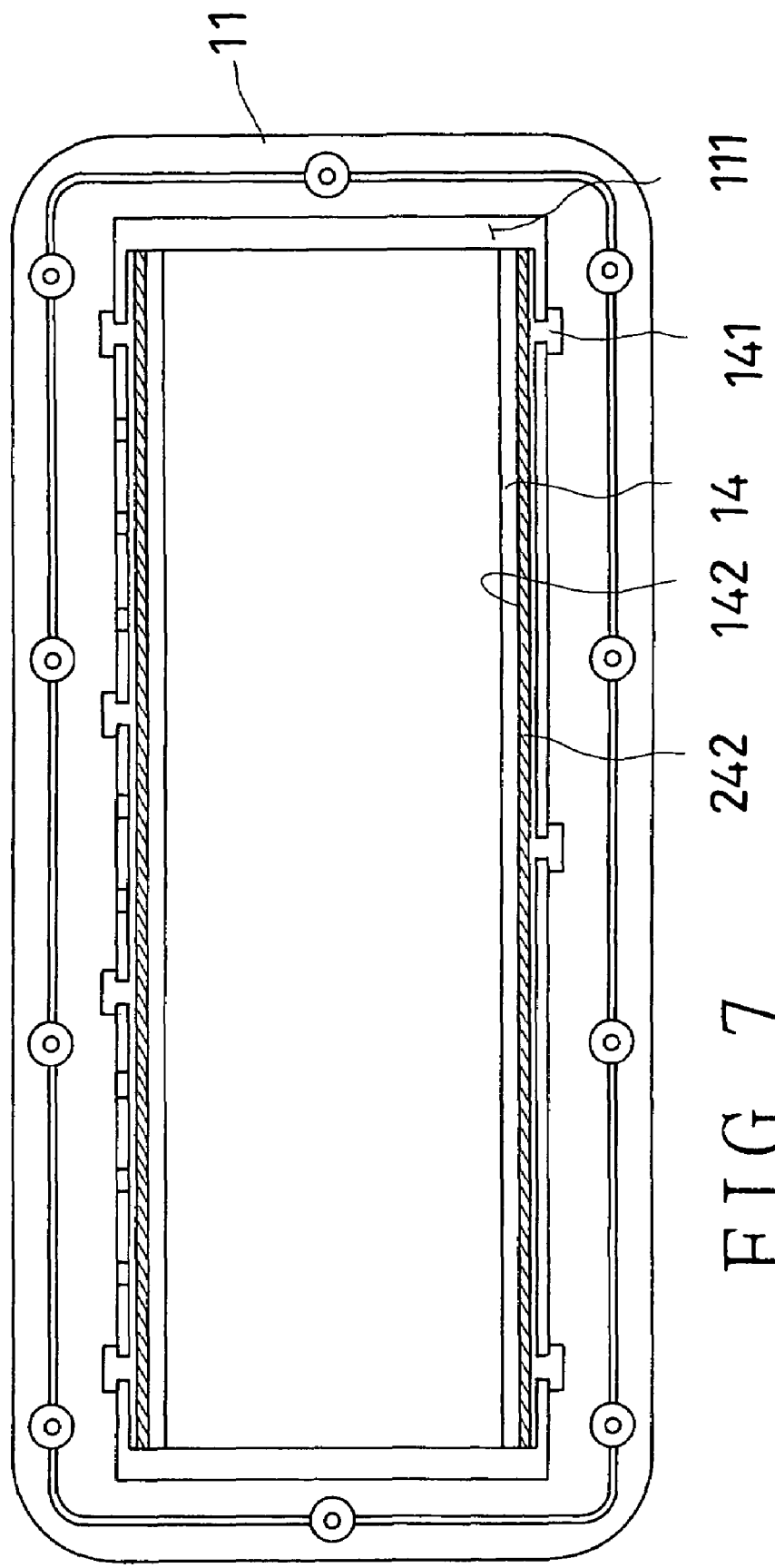
FIG. 7 is a cross-sectional view of the circuit-equipped light emitting board of the second embodiment.
Figure 8:
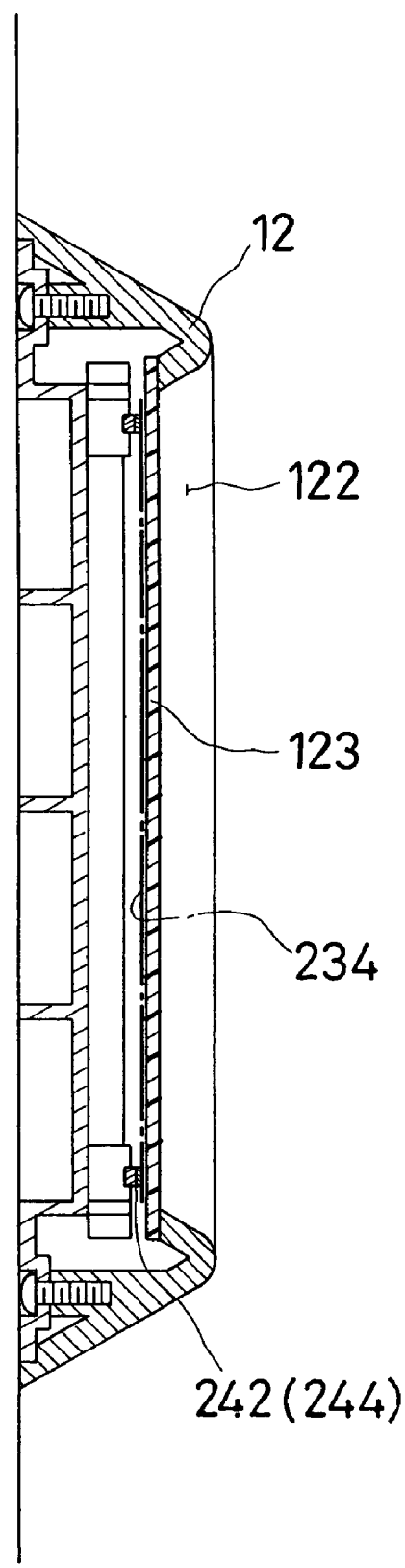
FIG. 8 is another cross-sectional view of the circuit-equipped light emitting board of the second embodiment.

Referring to FIGS. 6 to 8, a second embodiment of a high-efficiency circuit-equipped light emitting board in the present invention includes a main body 1, and a driving circuit 2.

Figure 9:
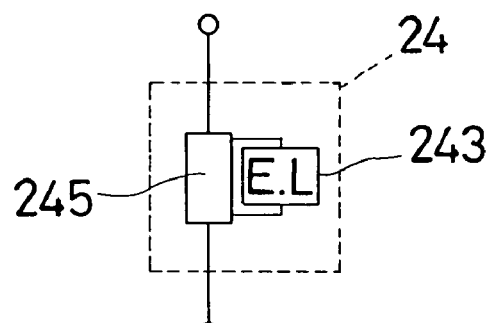
FIG. 9 is a partial circuit diagram of the circuit-equipped light emitting board of the second embodiment.

The main body 1 includes an inner frame 11, an outer frame 12 joined to the inner frame 11, and an Electro Luminate (E.L.) light emitting flat panel 243, which allows light to travel through, and has words, patterns, characters, drawings or signs adhered thereto. The E.L. light emitting flat panel 243 further has terminals 244, 244 on upper and lower edges thereof. The Upper and lower engaging bars 14, 14 are disposed along the upper and the lower portions of the surrounding portion of the inner frame 11 with engaging protrusions 141 being fitted to the gaps 112 and the engaging cavities 113. The upper and lower engaging bars 14, 14 each further has a trench 142 formed along the longest side thereof. Two electricity conducting bars 242 are respectively fitted to the trenches 141 of the upper and lower engaging bars 14, and 14, and are electrically connected to yet another terminal of the semi-conductor switch 22, and the other input terminal of the driving circuit 2 respectively while the light emitting flat panel 243 is disposed between the inner and the outer frames 11, 12 with the terminals 244, 244 being in electrical contact with corresponding ones of the electricity conducting bars 242. Furthermore, a driving element 245 is connected to the E.L. light emitting flat panel 243 for starting the same as shown in FIG. 9. Like the first embodiment, the E.L. light emitting flat panel 243 is disposed in the holding recess 111 with a light-passable plate 123 being disposed over the front side thereof, and the outer frame 12 is fitted to the inner frame 11 with the opening 122 thereof facing the holding recess 111 so that the E.L. light emitting flat panel 243 is secured to not possibly fall off. When it is dark, i.e. there is not enough light around, the photosensitive resistor 211 will sense such, and also activate the E.L. light emitting flat panel 243 for the same to emit light; thus, words, patterns, characters, drawings, or signs 243' on the E.L. light emitting flat panel 243 can be clearly seen.

What is claimed is:

1. A high-efficiency circuit-equipped light emitting board, comprising:

a main body including an inner frame having a holding recess, and an outer frame having an opening; the outer frame being joined to the inner frame with the opening facing the holding recess; the main body having a display board, which allows light to travel through, and has signs adhered thereto; the display board having a light-passable plate disposed on a front thereof; the display board being disposed between the frames with an edge of the opening preventing it from falling out of the outer frame; the indicating board having reflective surfaces on both upper and lower edges thereof; the display board having holes formed on the upper edge thereof and facing correspondingly ones of a set of gaps formed in the inner frame; and a driving circuit; the driving circuit having two power input terminals respectively connected to a first end of a first resistor and a first end of a second resistor; other ends of the resistors being electrically connected to a first terminal of a semi-conductor switch; a second terminal of the semi-conductor switch being connected to a first one of the power input terminals of the driving circuit, and a third terminal of the semi-conductor switch being connected to a combination of a resistor and a light-emitting device, which is connected to a second one of the power input terminals of the driving circuit at other end thereof; thus, said light-emitting board emits light, which then travels through the gaps of said inner frame and the holes of the display board, and finally travels outside through both the display board and the light-passable plate for making the signs of the board visible.

2. The high-efficiency circuit-equipped light emitting board as claimed in claim 1, wherein the outer frame has a hole while one of the first and the second resistors is a photosensitive resistor, and is located at such position that light outside the main body can travel thereto through the hole of the outer frame to be sensed with it whereby the light emitting board driven in the darkness and disconnected in the brightness automatically presents the best efficacy of saving electricity.

3. A high-efficiency circuit-equipped light emitting board, comprising:
- a main body including an inner frame having a holding recess, and an outer frame having an opening; the outer frame being joined to the inner frame with the opening facing the holding recess; the main body having a display board, the display board being an Electro Luminate (E.L.) light emitting flat panel, which has terminals on an upper edge and a lower edge thereof, and upper and lower portions of the inner frame have electricity conducting bars disposed along them; the terminals of the E.L. light emitting flat panel being in electrical contact with corresponding ones of the electricity conducting bars; a driving element being connected to the E.L. light emitting flat panel for starting the same; and
- a driving circuit; the driving circuit having two power input terminals respectively connected to a first end of a first resistor and a first end of a second resistor; other ends of the resistors being electrically connected to a first terminal of a semi-conductor switch; a second terminal of the semi-conductor switch being connected to a first one of the power input terminals of the driving circuit, a third terminal of the semi-conductor switch being connected to one of the electricity conducting bars, the other electricity conducting bar being connected to a second one of the power input terminals of the driving circuit.

4. The high-efficiency circuit-equipped light emitting board as claimed in claim 1, wherein the semi-conductor switch of the driving circuit is a transistor.

5. The high-efficiency circuit-equipped light emitting board as claimed in claim 3, wherein the semi-conductor switch of the driving circuit is a transistor.

* * * * *